(12) United States Patent
Raimann et al.

(10) Patent No.: US 11,984,801 B2
(45) Date of Patent: May 14, 2024

(54) VOLTAGE CONVERTER HAVING COUPLED PFC CHOKE

(71) Applicant: Bayerische Motoren Werke Aktiengesellschaft, Munich (DE)

(72) Inventors: Manuel Raimann, Ueberlingen (DE); Daniel Weida, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 857 days.

(21) Appl. No.: 16/976,830

(22) PCT Filed: Feb. 22, 2019

(86) PCT No.: PCT/EP2019/054472
§ 371 (c)(1),
(2) Date: Aug. 31, 2020

(87) PCT Pub. No.: WO2019/166345
PCT Pub. Date: Sep. 6, 2019

(65) Prior Publication Data
US 2020/0412272 A1    Dec. 31, 2020

(30) Foreign Application Priority Data

Mar. 1, 2018    (DE) ..................... 10 2018 203 054.5

(51) Int. Cl.
*H02M 7/219*    (2006.01)
*H01F 27/24*    (2006.01)
(Continued)

(52) U.S. Cl.
CPC .......... *H02M 1/4225* (2013.01); *H01F 27/24* (2013.01); *H01F 27/28* (2013.01); *H02M 1/4233* (2013.01); *H02M 7/219* (2013.01)

(58) Field of Classification Search
CPC .... H02M 1/0064; H02M 1/42; H02M 1/4225; H02M 1/4233; H02M 7/219; H01F 27/24; H01F 27/28
See application file for complete search history.

(56) References Cited

U.S. PATENT DOCUMENTS 5,731,666 A    3/1998  Folker et al.
6,980,077 B1   12/2005 Chandrasekaran et al.
(Continued)

FOREIGN PATENT DOCUMENTS

CN    102577058 A    7/2012

OTHER PUBLICATIONS

Chinese-language Office Action issued in Chinese Application No. 201980013871.8 dated Mar. 14, 2023 with English translation (12 pages).

(Continued)

*Primary Examiner* — Gary L Laxton
(74) *Attorney, Agent, or Firm* — Crowell & Moring LLP

(57) ABSTRACT

A voltage converter is designed to convert an alternating input voltage into a direct output voltage. The voltage converter includes a first sub-converter having a first switch half-bridge, which is coupled to a first pole of the input voltage by a first main coil, and a second sub-converter having a second switch half-bridge, which is coupled to the first pole of the input voltage by a second main coil. In addition, the voltage converter includes a diode half-bridge, which is jointly used by the first sub-converter and the second sub-converter. The voltage converter has a first return coil and a second return coil, which couple a center point of the diode half-bridge to a second pole of the input voltage. The first and second main coils and the first and second return coils form a coupled choke, the coupled choke having a choke core. The choke core has at least one outer (Continued)

leg, which is surrounded by windings of the first and/or second main coil and/or of the first and/or second return coil, and at least one center leg, which is not surrounded by windings of the main coils or of the return coils. The outer leg and the center leg have materials with different permeabilities.

8 Claims, 2 Drawing Sheets

(51) Int. Cl.
  *H01F 27/28* (2006.01)
  *H02M 1/42* (2007.01)

(56) References Cited

U.S. PATENT DOCUMENTS

| | | | |
|---|---|---|---|
| 7,479,770 | B2 | 1/2009 | Kohout et al. |
| 10,217,559 | B2 * | 2/2019 | Yang .................. H02M 1/4225 |
| 2010/0237694 | A1 | 9/2010 | Fuma et al. |
| 2010/0254168 | A1 | 10/2010 | Chandrasekaran |
| 2011/0031940 | A1 | 2/2011 | Green |
| 2013/0010504 | A1 | 1/2013 | Xiao et al. |
| 2017/0294833 | A1 | 10/2017 | Yang et al. |
| 2021/0202150 | A1 * | 7/2021 | Inaba ...................... H01F 41/12 |

OTHER PUBLICATIONS

International Search Report (PCT/ISA/210) issued in PCT Application No. PCT/EP2019/054472 dated May 9, 2019 with English translation (five pages).

German-language Written Opinion (PCT/ISA/237) issued in PCT Application No. PCT/EP2019/054472 dated May 9, 2019 (seven pages).

German-language Search Report issued in German Application No. 10 2018 203 054.5 dated Feb. 20, 2019 with partial English translation (13 pages).

\* cited by examiner

VOLTAGE CONVERTER HAVING COUPLED PFC CHOKE

BACKGROUND AND SUMMARY OF THE INVENTION

The invention relates to a multiphase voltage converter, in particular a rectifier, having a coupled choke as a power factor correction filter.

In an AC/DC converter or rectifier, e.g. for a charger of a vehicle driven at least partly electrically, the converter or rectifier being connected to a public electrical power supply system, a power factor correction (PFC) stage is typically used to satisfy power supply system connection conditions (in particular with regard to limited harmonic components in the power supply system current). In particular, multiphase PFC voltage converters can be used, such as e.g. a so-called totem pole converter. The individual chokes of a multiphase PFC voltage converter can be embodied as coupled chokes. The use of a multiphase voltage converter having coupled chokes makes it possible to reduce the ripple current.

A multiphase voltage converter has semiconductor switches (in particular gallium nitride (GAN) transistors) that are switched at a relatively high frequency (e.g. at one MHz or more). The switching of the semiconductor switches can give rise to common mode (CM) and differential mode (DM) interference, which typically has to be compensated for by means of a multistage power supply system filter in order to satisfy the EMC (electromagnetic compatibility) requirements on the power supply system side.

The present document is concerned with the technical problem of reducing the common mode interference of a multiphase voltage converter, in particular in order simultaneously to reduce the weight, the costs and the structural space for the PFC choke and thus for a charger of a vehicle.

The problem is solved by the independent claim. Advantageous embodiments are described in the dependent claims, inter alia. It is pointed out that additional features of a patent claim dependent on an independent patent claim without the features of the independent patent claim or merely in combination with a subset of the features of the independent patent claim can form a separate invention which is independent of the combination of all features of the independent patent claim and which can be made the subject of an independent claim, of a divisional application or of a subsequent application. This applies in the same way to technical teachings which are described in the description and which can form an invention independent of the features of the independent patent claims.

In accordance with one aspect, a description is given of a voltage converter, in particular a rectifier, which is configured to convert an AC input voltage into a DC output voltage. The voltage converter can be part of a charger, in particular of a charger of a road motor vehicle.

The voltage converter comprises a first sub-converter having a first switch half-bridge, wherein the first switch half-bridge is coupled to a first pole of the input voltage via a first main coil. The first switch half-bridge can comprise a first switch and a second switch, which are arranged in series between a positive pole and a negative pole of the output voltage. The first main coil can then couple a center point between the first switch and the second switch of the first switch half-bridge to the first pole of the input voltage. The switches of the first switch half-bridge can be embodied in each case as gallium nitride (GaN) transistors.

Furthermore, the voltage converter comprises a second sub-converter having a second switch half-bridge, which is coupled to the first pole of the input voltage via a second main coil. Analogously to the first switch half-bridge, the second switch half-bridge can also comprise a first switch and a second switch, which are arranged in series between the positive pole and the negative pole of the output voltage. The second main coil can then couple a center point between the first switch and the second switch of the second switch half-bridge to the first pole of the input voltage. The switches of the second switch half-bridge can be embodied in each case as gallium nitride (GaN) transistors.

Moreover, the voltage converter comprises a diode half-bridge used jointly by the first sub-converter and the second sub-converter. The diode half-bridge can comprise a first diode and a second diode, which are arranged in series between the positive pole and the negative pole of the output voltage.

The voltage converter furthermore comprises a first return coil and a second return coil, which couple a center point of the diode half-bridge to a second pole of the input voltage. In other words, a part of the inductance of the first sub-converter and a part of the inductance of the second sub-converter can be incorporated as return coils into the return path of the sub-converters. The common mode interference of the voltage converter can thus be reduced. The inductance of a main coil can be greater than or equal to the inductance of a corresponding return coil. By way of example, the ratio between the inductances of the main coil and of the return coil can be in a range of between 1:1 and 5:1.

The first and second sub-converters can be embodied in each case as rectifiers. In this case, a voltage boost conversion can be effected in the context of the rectifying function. During a positive half-cycle of the input voltage, the first switch of a sub-converter can be clocked, while the second switch is operated as a diode. Furthermore, during a negative half-cycle of the input voltage, the second switch of a sub-converter can be clocked and the first switch is operated as a diode. A sub-converter can thus be operated as a boost converter both during a positive half-cycle and during a negative half-cycle. In this case, the rectifying function can be effected by reversing the operation of the switches of the switch half-bridge of a sub-converter.

The frequency of the AC input voltage is typically 50 Hz or 60 Hz. The clocked operation of a switch can be in a frequency range of 100 kHz, 1 MHz or more.

The first sub-converter and the second sub-converter can be operated in a manner phase-shifted with respect to one another in relation to the clock of the switches of the first and second switch half-bridges. In this case, the phase shift can be e.g. 180°. The power of the voltage converter can be increased by the use of a plurality of (optionally phase-shifted) sub-converters. Furthermore, ripple of the output voltage and/or of the output current of the voltage converter can be reduced.

The first main coil and the second main coil in combination with the first return coil and the second return coil can form a common, coupled choke. In this case, the coupled choke has a common choke core. The choke core comprises at least one outer leg and at least one center leg. The at least one outer leg is enclosed by turns of the first and/or second main coil and/or the first and/or second return coil. On the other hand, the at least one center leg is not enclosed by turns of the main coils and the return coils. In particular, the center leg can be enclosed by no turns.

In this case, the at least one outer leg and the at least one center leg comprise materials having different permeabilities or relative permeabilities in each case. In particular, the material of the outer leg can have a permeability that is greater than a permeability of the material of the center leg. By way of example, the permeability (in particular the relative permeability) of the material of the outer leg can be greater than the permeability (in particular the relative permeability) of the center leg by a factor of 10, 100 or more. Furthermore, the material of the at least one outer leg and the material of the at least one center leg can have in each case a relative permeability of 10, 20 or more (e.g. can be at least ferromagnetic in each case). By way of example, the material of the outer leg can comprise nanocrystalline material and/or ferrite. The material of the center leg can comprise ferromagnetic metal grains and/or a ferromagnetic powder.

A description is thus given of a (multiphase) voltage converter comprising a common, magnetically coupled choke, having a choke core having regions of varying permeability. The common mode interference of the voltage converter can thus be reduced. In particular, the relative permeabilities of the different regions of the choke core can be chosen (e.g. in the context of experiments) so as to reduce, in particular to minimize, the common mode interference and/or to reduce the structural space of the choke core. It is thus possible to reduce the complexity of a power supply system filter for compliance with EMC requirements, with the result that the size, the structural space and the weight of a charger comprising the voltage converter can be reduced.

The permeability of the at least one outer leg and/or of the at least one center leg is preferably substantially homogeneous over the entire spatial extent of the outer leg and/or of the center leg. In particular, the choke core can have just two different regions (the region of the one or more outer legs and the region of the one or more center legs) having in each case a substantially homogeneous permeability. The efficiency of the choke core can thus be increased further.

The choke core can comprise a first outer leg and a second outer leg, wherein the first outer leg extends through the turns of the first main coil and through the turns of the first return coil, and wherein the second outer leg extends through the turns of the second main coil and through the turns of the second return coil. In other words, the first outer leg can run through the first main coil and through the first return coil. On the other hand, the second outer leg can run through the second main coil and through the second return coil.

The first outer leg and the second outer leg can form a contiguous, substantially homogeneous, magnetic path for a main magnetic flux, which passes through all the turns of the first and second main coils and of the first and second return coils. In particular, the first outer leg and the second outer leg can be embodied in each case in a C-shaped fashion and together form a magnetic circuit for the main magnetic flux.

On the other hand, the center leg can form a magnetic path for a magnetic flux that passes through only a portion of the turns of the first and second main coils and of the first and second return coils. The center leg can run at least partly parallel to the first and second outer legs. Furthermore, both ends of the center leg can be in direct contact with the circuit formed by the outer legs. In particular, the center leg can form a substantially homogeneous magnetic path from a first point to a second point of the magnetic circuit (as a kind of short circuit of the magnetic circuit for the main magnetic flux), e.g. in order to further reduce the degree of common mode interference.

In accordance with a further aspect, a description is given of a charger comprising the voltage converter described in this document.

In accordance with the further aspect, a description is given of a road motor vehicle (in particular an automobile or a truck or a bus or a motorcycle) comprising the voltage converter described in this document and/or the charger described in this document.

It should be noted that the devices and systems described in this document can be used both by themselves and in combination with other devices and systems described in this document. Furthermore, any aspects of the devices and systems described in this document can be combined with one another in diverse ways. In particular, the features of the claims can be combined with one another in diverse ways.

The invention is described in greater detail below on the basis of exemplary embodiments.

DETAILED DESCRIPTION OF THE DRAWINGS

Figure 1:
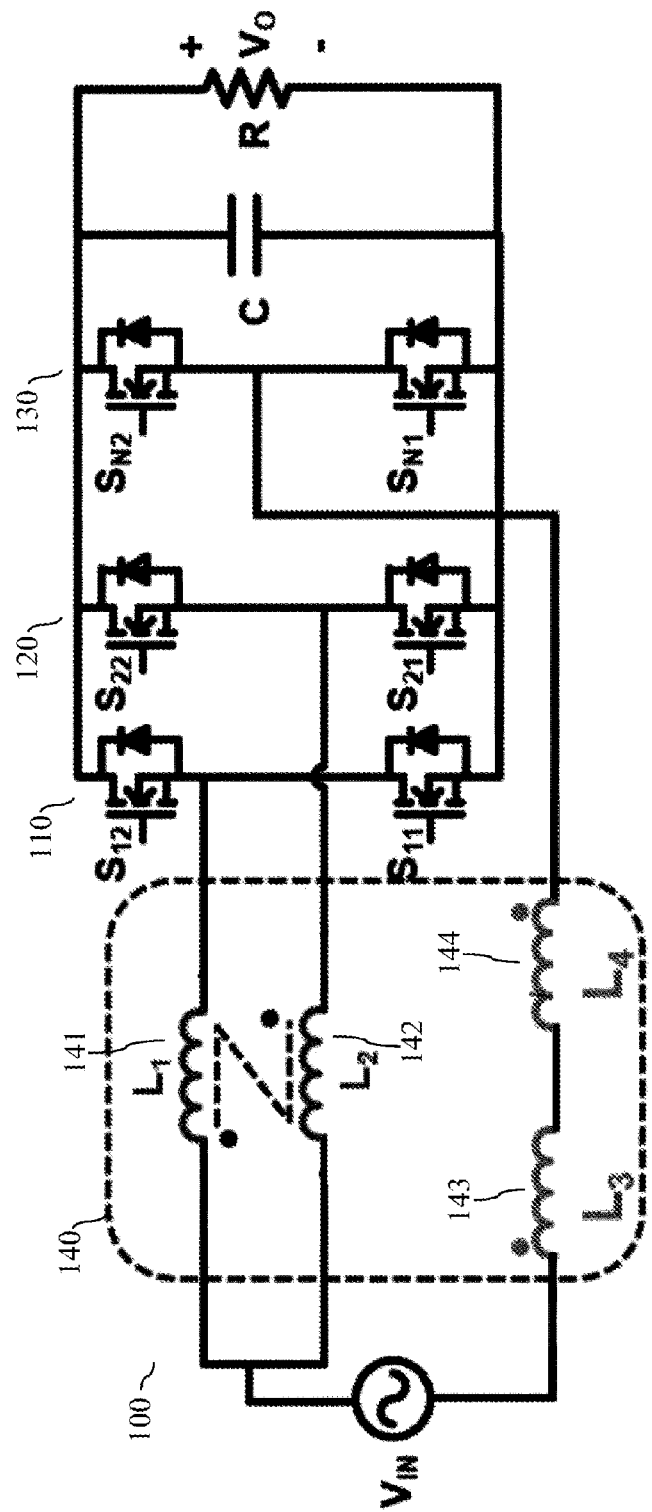
FIG. 1 is a circuit diagram of an exemplary multiphase voltage converter having a coupled PFC choke.

As set out in the introduction, the present document is concerned with reducing CM or common mode interference in a multiphase voltage converter. FIG. 1 shows an exemplary two-phase rectifier 100, comprising a first transistor half-bridge 110 for a first sub-rectifier and a second transistor half-bridge 120 for a second sub-rectifier. The two sub-rectifiers are operated e.g. with a phase offset of 180° (in relation to the clock cycle of the switches $S_{11}$, $S_{112}$, $S_{21}$, $S_{22}$ of the transistor half-bridges 110, 120). Furthermore, the rectifier 100 comprises a diode half-bridge 130 (having the diodes $S_{N1}$ and $S_{N2}$) and also a coupled choke 140 having sub-coils 141, 142, 143 144.

The rectifier 100 is configured to convert an AC (alternating current) input voltage $V_{IN}$ into a DC (direct current) output voltage $V_O$. In this case, during a positive half-cycle of the input voltage via the first main coil $L_1$ 141 with the clocked first switch $S_{11}$ and the second switch $S_{12}$ operated as a diode, the first sub-rectifier forms a boost converter. This holds true in a corresponding manner for the second sub-rectifier with the second main coil $L_2$ 142. During a negative half-cycle of the input voltage, the first sub-rectifier forms a boost converter via the first main coil $L_1$ 141 with the clocked second switch $S_{12}$ and the first switch $S_{11}$ operated as a diode. This holds true in a corresponding manner for the second sub-rectifier. Efficient rectification with active power factor correction can thus be effected.

The common mode interference can be reduced by a portion of the inductance of the sub-rectifiers being incorporated into the return path of the sub-rectifiers, wherein the return path runs from the center point of the diode half-bridge 130 to the second pole of the input voltage. In particular, the rectifier 100 can comprise a return coil $L_3$ 143 and a return coil $L_4$ 144, wherein the main coils 141, 142 and the return coils 143, 144 are magnetically coupled to one another. The reduction of the common mode interference enables the dimensioning of a power supply system filter for filtering this interference to be made smaller, with the result that the size, the costs and the weight of a charger comprising the rectifier 100 can be reduced.

Figure 2:
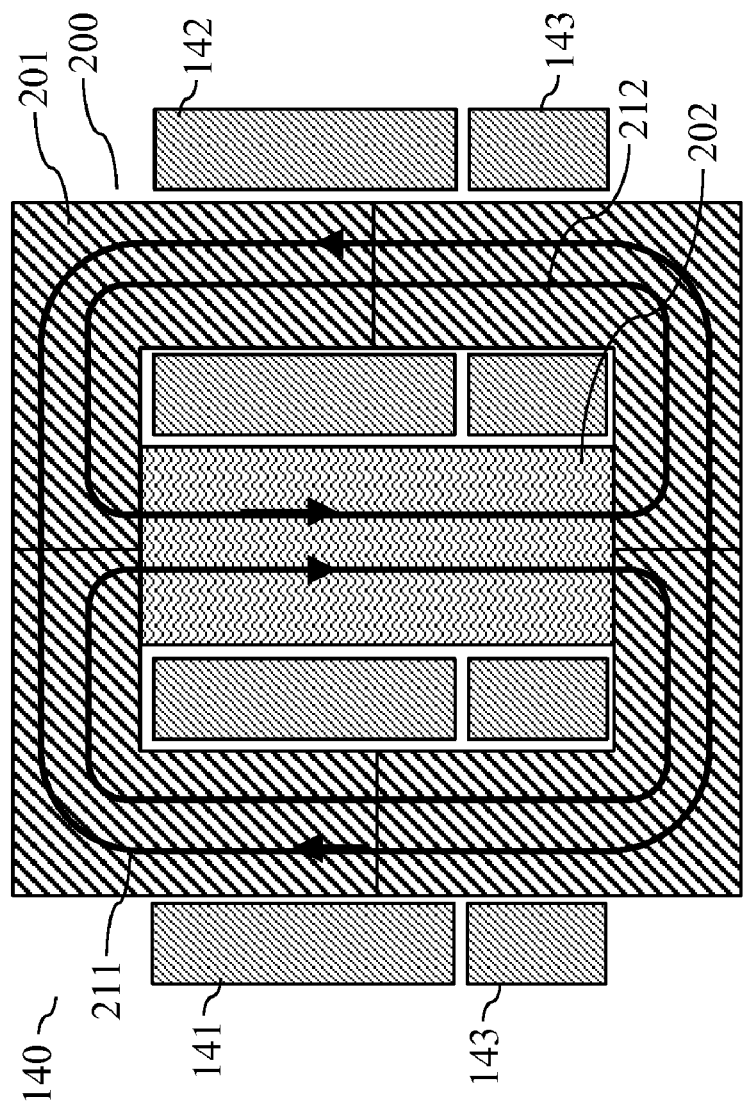
FIG. 2 shows an exemplary multipartite choke core for a coupled PFC choke.

FIG. 2 shows an exemplary coupled choke 140 for a rectifier 100. In this case, the choke 140 has a multipartite coil or choke core 200. In particular, the choke core 200 has outer legs 201, wherein a first outer leg 201 is enclosed by the turns of the first main coil 141 and the first return coil 143, and wherein a second outer leg 201 is enclosed by the turns of the second main coil 142 and the second return coil 144. The outer legs 201 are magnetically connected to one another in order to guide a main magnetic flux 211 that passes through all the turns of the coils 141, 142, 143, 144. For this purpose, the outer legs 201 can be embodied in a C-shaped fashion, and can be connected to one another in such a way as to result in a homogeneous magnetic circuit for the main magnetic flux 211.

The choke core 200 comprises a center leg 202, which short-circuits the two outer legs 201 and in this case is enclosed by none of the turns of the coils 141, 142, 143, 144. The center leg 202 guides a magnetic (leakage) flux 212 that does not pass through all the turns of the coils 141, 142, 143, 144 of the coupled choke 140. The ends of the center leg 202 can be directly connected to a respective outer leg 201, with the result that the magnetic path for the (leakage) flux 212 has an inhomogeneity with regard to the permeability only at the (two) transitions between an outer leg 201 and the center leg 202.

The outer legs 201 and the center leg 202 of the choke core 200 can comprise different materials having different properties. In particular, in the outer magnetic path (i.e. in the outer legs 201), it is possible to use a core material (e.g. nanocrystalline material and/or ferrite) having the highest possible permeability since this is advantageous for coupling the windings of the coils 141, 142, 143, 144 and thus for reducing the current ripple in the choke 140 and thus for reducing the losses in the choke 140. For the inner magnetic path (i.e. for the center leg 202), it is possible to use a core material (e.g. a powder core) having low permeability in order to optimize this part of the choke core 200 for storing magnetic energy.

The use of different materials for different regions of the choke core 200 enables the choke parameters to be optimized independently in order to further reduce common mode interference. The size of a power supply system filter for filtering common mode interference can thus be reduced further in order to reduce the costs, the structural space and the weight of chargers.

The present invention is not restricted to the exemplary embodiments shown, in particular, it should be noted that the description and the figures are intended merely to illustrate the principle of the proposed devices and systems.

What is claimed is:

1. A voltage converter configured to convert an AC input voltage into a DC output voltage; the voltage converter comprising:
    a first sub-converter having a first switch half-bridge, which is coupled to a first pole of the input voltage via a first main coil;
    a second sub-converter having a second switch half-bridge, which is coupled to the first pole of the input voltage via a second main coil;
    a diode half-bridge used jointly by the first sub-converter and the second sub-converter;
    a first return coil and a second return coil, which couple a center point of the diode half-bridge to a second pole of the input voltage; wherein
    the first and second main coils and the first and second return coils form a coupled choke,
    the coupled choke has a choke core,
    the choke core has at least one outer leg enclosed by turns of at least one of the first main coil, the second main coil, the first return coil, and the second return coil, and has at least one center leg not enclosed by turns of the main coils and the return coils;
    the at least one outer leg and the at least one center leg comprise materials having different permeabilities;
    the choke core comprises a first outer leg and a second outer leg,
    the first outer leg extends through turns of the first main coil and of the first return coil,
    the second outer leg extends through turns of the second main coil and of the second return coil,
    the first outer leg and the second outer leg form a contiguous, substantially homogeneous, magnetic path for a main magnetic flux, which passes through all turns of the first and second main coils and of the first and second return coils,
    the at least one center leg runs at least partly parallel to the first and second outer legs,
    each of the first outer leg and the second outer leg is embodied in a C-shaped fashion and together form a magnetic circuit, and
    both ends of the at least one center leg are in direct contact with the magnetic circuit formed by the first outer leg and the second outer leg, and form a substantially homogeneous magnetic path from a first region to a second region of the magnetic circuit.

2. The voltage converter according to claim 1, wherein a material of the at least one outer leg has a permeability that is greater than a permeability of a material of the at least one center leg, and
    the permeability of the material of the at least one outer leg is greater than the permeability of the at least one center leg by a factor of 10 or more.

3. The voltage converter according to claim 1, wherein at least one of:
    a material of the at least one outer leg and a material of the at least one center leg have a relative permeability of 10 or more; and
    a permeability of at least one of the at least one outer leg and the at least one center leg is substantially homogeneous over an entire spatial extent thereof.

4. The voltage converter according to claim 1, wherein at least one of:
    a material of the at least one outer leg comprises at least one of nanocrystalline material and ferrite; and
    a material of the at least one center leg comprises ferromagnetic metal grains or a ferromagnetic powder.

5. The voltage converter according to claim 1, wherein the at least one center leg forms a magnetic path for a magnetic flux that passes through only a portion of the turns of the first and second main coils and of the first and second return coils.

6. The voltage converter according to claim 1, wherein each switch half-bridge of a sub-converter comprises a first switch and a second switch, which are arranged in series between a positive pole and a negative pole of the output voltage, and
    the main coil of a sub-converter couples a center point between the first switch and the second switch to the first pole of the input voltage.

7. The voltage converter according to claim 6, wherein during a positive half-cycle of the input voltage, the first switch of a sub-converter is clocked and the second switch is operated as a diode, and
    during a negative half-cycle of the input voltage the second switch of a sub-converter is clocked and the first switch is operated as a diode.

8. The voltage converter according to claim 1, wherein the first sub-converter and the second sub-converter are operated in a manner phase-shifted with respect to one another in relation to a clock of switches of the first and second switch half-bridges.

\* \* \* \* \*